(12) United States Patent
Mizutori et al.

(10) Patent No.: US 8,746,078 B2
(45) Date of Patent: Jun. 10, 2014

(54) FIELD DEVICE WITH INTERNAL BATTERY FOR MEASURING A PHYSICAL QUANTITY OF A FLUID

(75) Inventors: Kenji Mizutori, Tokyo (JP); Ichiro Mitsutake, Tokyo (JP); Takashi Watanabe, Tokyo (JP)

(73) Assignee: Azbil Corporation, Tokyo (JP)

( * ) Notice: Subject to any disclaimer, the term of this patent is extended or adjusted under 35 U.S.C. 154(b) by 414 days.

(21) Appl. No.: 13/172,934

(22) Filed: Jun. 30, 2011

(65) Prior Publication Data

US 2012/0000294 A1  Jan. 5, 2012

(30) Foreign Application Priority Data

Jul. 5, 2010  (JP) ................................. 2010-152830

(51) Int. Cl.
*G01F 1/00* (2006.01)
*H01M 2/10* (2006.01)

(52) U.S. Cl.
USPC ............... 73/861; 73/861.11; 429/90; 429/96

(58) Field of Classification Search
None
See application file for complete search history.

(56) References Cited

U.S. PATENT DOCUMENTS

| | | | |
|---|---|---|---|
| 3,023,528 A * | 3/1962 | Rouby | 42/84 |
| 4,713,714 A * | 12/1987 | Gatti et al. | 360/137 |
| 7,709,136 B2 * | 5/2010 | Touchton et al. | 429/96 |
| 8,042,410 B2 | 10/2011 | Budmiger et al. | |
| 2005/0118495 A1 | 6/2005 | Kim | |
| 2006/0171108 A1 * | 8/2006 | Albrecht et al. | 361/685 |
| 2008/0158808 A1 * | 7/2008 | Camarena et al. | 361/685 |
| 2009/0301218 A1 | 12/2009 | Budmiger et al. | |
| 2009/0310303 A1 * | 12/2009 | Najbert | 361/695 |

FOREIGN PATENT DOCUMENTS

| | | |
|---|---|---|
| CN | 101636640 A | 1/2010 |
| EP | 0323182 A2 | 7/1989 |
| JP | 09092237 A | 4/1997 |
| JP | 2003-151519 A | 5/2003 |
| JP | 2007-273180 A | 10/2007 |

OTHER PUBLICATIONS

Chinese Office Action, dated Oct. 12, 2013, which issued during the prosecution of Chinese Patent Application No. 201110199317.9, which corresponds to the present application.

* cited by examiner

*Primary Examiner* — Harshad R Patel
(74) *Attorney, Agent, or Firm* — Troutman Sanders LLP

(57) ABSTRACT

A wave ring spring is provided between a top face of a battery case and an inner wall of an equipment case. A plurality of silicone rubber pieces is provided between a bottom face of the battery case and an inner wall of the equipment case. A plurality of elastic tabs is provided between the outer peripheral surfaces that connect between the top face and the bottom face of the battery case and inner walls of the equipment case. The elastic tabs are formed integrally with the outer peripheral surfaces of the battery case.

6 Claims, 3 Drawing Sheets

(a)

(b)

Prior Art

FIELD DEVICE WITH INTERNAL BATTERY FOR MEASURING A PHYSICAL QUANTITY OF A FLUID

CROSS REFERENCE TO RELATED APPLICATIONS

The present application claims priority under 35 U.S.C. §119 to Japanese Patent Application No. 2010-152830, filed Jul. 5, 2010, which is incorporated herein by reference.

FIELD OF TECHNOLOGY

The present invention relates to a field device with an internal battery, for measuring a physical quantity of a fluid that flows in a pipe portion, with the internal battery as the driving power source.

BACKGROUND OF THE INVENTION

Conventionally, electromagnetic flow meters for measuring the flow of fluids, for example, have been used as devices for measuring physical quantities of fluids flowing in the pipe portions. These electromagnetic flow meters have measured flows of fluids using the Faraday's law of induction wherein an electromotive force that is proportional to the speed of flow is induced in the direction that is perpendicular to the direction of flow and to the direction of the magnetic field when an electrically conductive fluid flows across a magnetic field.

Because of this, the electromagnetic flow meters have been structured from detecting portions, which are structured from measuring tubes, electrodes, and magnetic field generating means (such as a coil or a magnet); a converting portion for calculating a flow rate value by performing signal processing on an input signal from the detecting portion, and for displaying the flow rate value on an attached displaying portion, or converting the flow rate value into a corresponding electric current signal for the outside; and a connecting portion for connecting the detecting portion and the converting portion mechanically, and for connecting the power supply lines and signal lines that are connected between the detecting portion and the converting portion. Moreover, typical electromagnetic flow meters are shipped in a form wherein the detecting portion, the converting portion, and the connecting portion are integrated into a single unit, to be attached to a pipe in a work area.

Recently there has been increasing opportunity for the use of battery-driven electromagnetic flow meters (hereinafter termed "battery-type electromagnetic flow meters"), in contrast to the two-wire and four-wire-type electromagnetic flow meters that operate by receiving a power supply from the outside. The battery-type electromagnetic flow meter operates with a built-in battery as the driving source, instead of external power; however, the internal battery is held in a battery case, and is contained in a case together with the converting portion and the displaying portion (within an equipment case).

FIG. 3 is a schematic diagram of the battery-type electromagnetic flow meter. FIG. 3 (a) is a plan view, and FIG. 3 (b) is a side view. In these figures: 1 is a measuring tube (a pipe portion); 2 is a connecting portion that extends from the measuring tube; 3 is an equipment case that is connected to the connecting portion 2, and an internal battery 4 is contained together with the converting portion and the displaying portion within this equipment case 3. In the equipment case 3, the internal battery 4 is held in a battery case 5, and, in this state, the electrical connection is maintained with the electrical circuitry therein.

This battery-type electromagnetic flow meter is installed on a pipe in a workplace for use, but at the beginning of the flow rate measurement of the fluid, the measurement tube 1 is vibrated by the fluid that flows within the measurement tube 1, and that vibration propagates through the connecting portion 2 to the equipment case 3. When the equipment case 3 vibrates, the relative position between the battery case 5 and the equipment case 3 will change, which, in some cases, makes it impossible to maintain the electrical contact between the internal battery 4 and the electric circuitry within the equipment case 3.

In response, Japanese Unexamined Patent Application Publication 2003-151519 ("JP '519") describes a battery enclosure mechanism that prevents the disconnection of the power supply when there is a physical shock due to dropping or vibration, in a structure wherein a battery box (corresponding to the battery case 5) is contained within a case main unit (corresponding to the equipment case 3).

In the battery containing structure disclosed in JP '519, a contact terminal that contacts the positive electrode of the battery and a conductive spring terminal that contacts the negative electrode of the battery are provided within the battery box, and the battery box is contained within the case main unit so as to be able to slide in the lengthwise direction of the battery, where spring members are provided on the inside of the case main unit so as to press against and hold the ends on both sides of the terminals of the battery box, where the spring constants of the spring members within the case main unit are lower than the spring constant of the spring terminal in the battery box. That is, the spring members within the case main unit have higher elasticity then the spring terminal of the battery box. As a result, when there is a physical stock from the outside, the spring members within the case main unit absorb the shock more readily than the spring terminal in the battery box, securing the supply of power from the battery in the battery box.

However, the battery containing structure disclosed in JP '519 is only effective for vibration in the lengthwise direction of the battery, and has no effect when it comes to vibration in the direction perpendicular to this direction. That is, in the case of a battery-type electromagnetic flow meter, the battery containing structure set forth in JP '519 cannot be used as-is for a device wherein there is the potential for the receipt of a vibration in a variety of directions through vibrations propagating to the equipment case from a variety of directions.

The present invention is to solve this type of problem, and the object thereof is to provide an internal battery-type field device wherein the connection between the battery in a battery case and the electric circuits that are contained in an equipment case is secured, even in relation to vibrations from any given direction on the equipment case.

SUMMARY OF THE INVENTION

The present invention, in order to achieve such an object, has an internal battery-type field device for measuring a physical quantity of a fluid flowing in a pipe portion, with an internal battery as the driving power supply, comprising: a pipe portion, a connecting portion that extends from the pipe portion, an equipment case that is connected to the connecting portion, and an internal battery contained in the equipment case, comprising: a battery case for holding the internal battery; a first elastic member for exhibiting an elastic force, interposed between a first face, which is one face of the battery case, and an inner wall of the equipment case; a second elastic member for exhibiting an elastic force, interposed between a second face and an inner wall of the equipment case, where the second face is a face of the battery case that is opposite from the first face; and a third elastic member, for exhibiting an elastic force, interposed between a third face and an inner wall of the equipment case, where the third face is an outer peripheral surface that connects between the first face and the second face of the battery case.

Given the present invention, the elastic force of the first elastic member, which is interposed between the first face of the battery case and an inner wall of the equipment case, and of the second elastic member, which is interposed between the second face of the battery case and an inner wall of the equipment case, absorbs the vibration in the direction that is perpendicular to the first face and the second face of the battery case, and the elastic force of the third elastic member, which is interposed between the outer peripheral face (the third face), connect between the first face and the second face of the battery case, and the inner walls of the equipment case absorb vibrations in the directions that are perpendicular to the third faces of the battery case (that is, all faces aside from the first face and the second face), making it possible to ensure the electrical connection between the battery within the battery case and the electric circuits that are contained in the equipment case, in relation to vibrations on the equipment case in any direction.

DETAILED DESCRIPTION OF THE INVENTION

Figure 1:
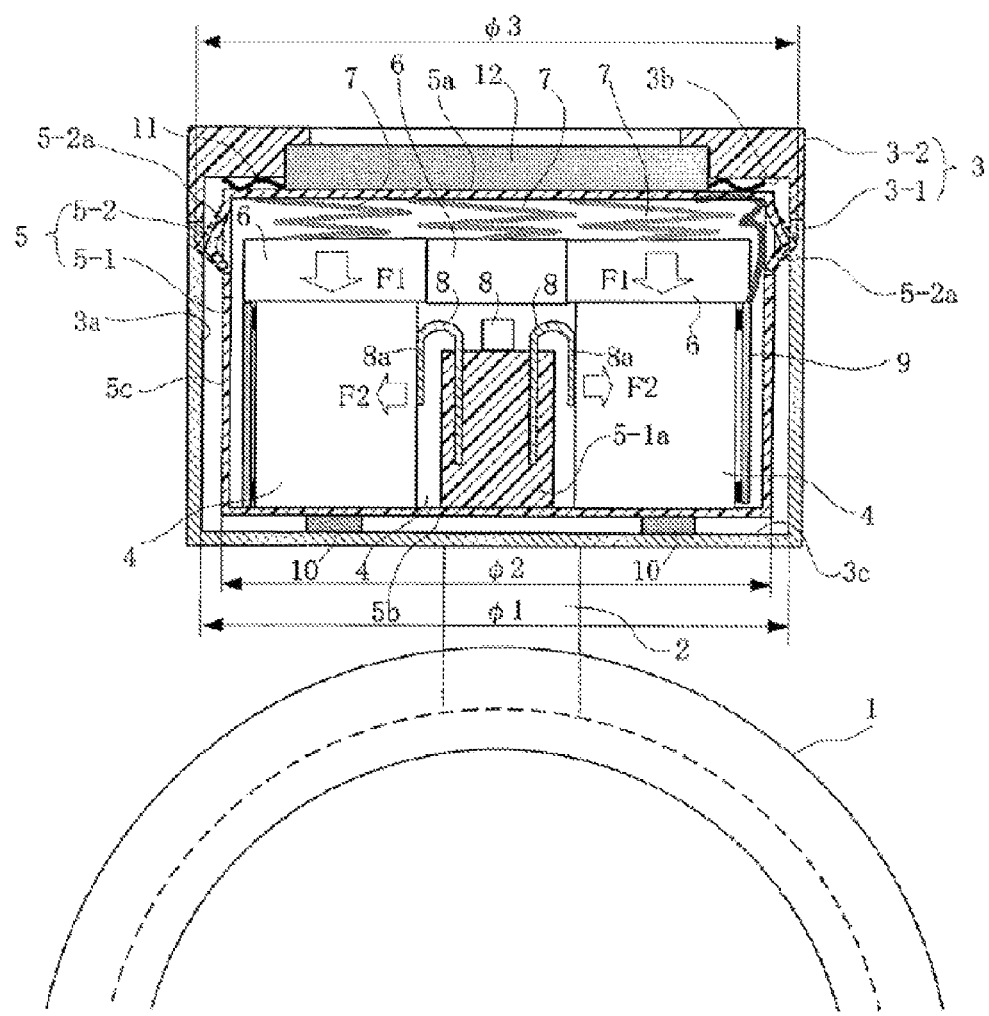
FIG. 1 is a cross-sectional diagram illustrating schematically the interior structure of an equipment case in a battery-type electromagnetic flow meter, an internal battery-type field device according to the present invention.
Figure 3:
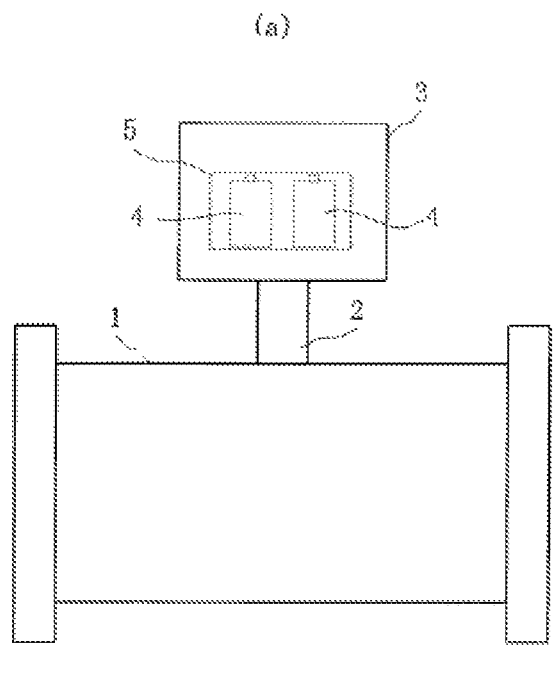
FIG. 3 is a diagram illustrating schematically a prior art battery-type electromagnetic flow meter.
Figure 3:
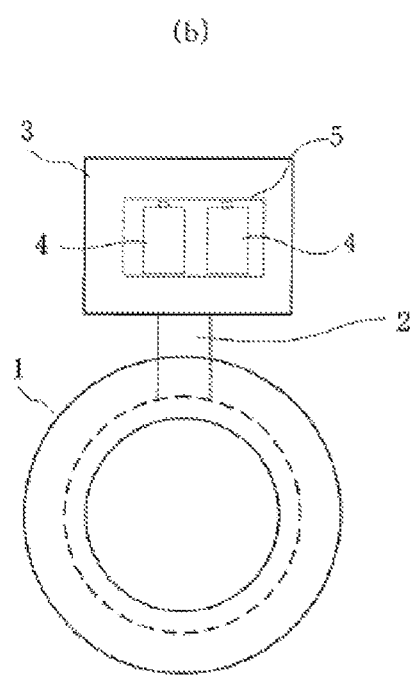

An example according to the present invention is explained below in detail, based on the drawings. FIG. 1 shows the interior structure of an equipment case in a battery-type electromagnetic flow meter as one form of embodiment of an internal battery-type field device according to the present invention. In this figure, codes that are the same as those in FIG. 3 indicate identical or equivalent structural elements as the structural elements explained in reference to FIG. 3, and explanations thereof are omitted.

In this battery-type electromagnetic flow meter, a battery case 5 has a case main unit 5-1 and a case top cover 5-2, where a cylindrical battery case 5 is structured by fitting the case top cover 5-2 onto the main unit 5-1. Additionally, the equipment case 3 comprises a main unit 3-1 and a top cover 3-2, where the cylindrical equipment case 3 is structured by fitting the top cover 3-2 onto the main unit 3-1.

Note that in the battery case 5, the case main unit 5-1 and the case top cover 5-2 are made from plastic, and in the equipment case 3, the main unit 3-1 is made from stainless steel, and the top cover 3-2 is made from plastic.

A plurality of internal batteries 4 is held in a state wherein the positions thereof are constrained within the battery case 5. Each of the internal batteries 4 is covered by a plastic battery cap 6, where a conical coil spring 7 is provided between the battery cap 6 and the case top cover 5-2. That is, the conical coil spring 7 that is provided between the battery cap 6 and the case top cover 5-2 is compressed and deformed by fitting the case top cover 5-2 onto the case main unit 5-1, so that a strong force F1 (a force that is slightly stronger than that of the silicon rubber 10, described below, and the wave spring 11) pushes each of the internal batteries 4 against the bottom face of the case main unit 5-1.

Additionally, a pedestal portion 5-1*a* is provided integrally in the center portion of the case main unit 5-1, where a number of side springs 8 equal to the number of batteries is inserted into this pedestal portion 5-1*a*, to thereby push each individual internal battery 4 in the sideways direction with a strong force F2 (a spring force that is slightly stronger than that of the elastic tab 5-2*a*, described below) by the curved surface 8*a* of the side spring 8.

Additionally, in the battery case 5, a flexible printed circuit board (FPC) 9 that is connected to the positive terminal and the negative terminal of each individual internal battery 4 is provided so as to enclose the outer periphery of the plurality of internal batteries 4 in the battery case 5. Additionally, elastic tabs (flat springs) 5-2*a*, corresponding to the third elastic members according to the present invention, are provided in a plurality of locations (at least three), formed monolithically with the outer peripheral surfaces as cut-away portions from the outer peripheral surface of the case top cover 5-2, in the battery case 5. These elastic tabs 5-2*a* are provided at specific angular intervals on the outer peripheral surface of the case top cover 5-2, where if, for example, the number of locations were three, then they should be provided at intervals of 120°. Moreover, the elastic tabs 5-2*a* have higher elasticity than the side springs 8.

The inner diameter $\phi 1$ of the main unit 3-1 of the equipment case 3 is made larger than the outer diameter $\phi 2$ of the case main unit 5-1 of the battery case 5, wherein the battery case 5 is made smaller than the outer diameter $\phi 3$ (the outer diameter of the case top cover 5-2 that includes the elastic tabs 5-2*a*) prior to dropping the battery case 5 into the main unit 3-1 of the equipment case 3. Doing so causes the elastic tabs 5-2*a* that are provided on the outer peripheral surface of the case top cover 5-2 to deform elastically, pressed by the inner wall faces of the main unit 3-1 of the equipment case 3, when the battery case 5 is dropped into the main unit 3-1 of the equipment case 3. That is, the plurality of elastic tabs 5-2*a* that is provided on the outer periphery surface of the case top cover 5-2, is interposed between the outer peripheral face (the third face) 5*c* that connects with the top face (the first face) 5*a* and the bottom face (the second face) 5*b* of the battery case 5 and the inner walls 3*a* of the equipment case 3, to exhibit elastic force.

A plurality (at least three) cylindrical silicone rubber pieces 10, corresponding to the second elastic members, is disposed at the bottom surface within the main unit 3-1 of the equipment case 3, and is interposed between the bottom surface within the main unit 3-1 of the equipment case 3 and the bottom face 5*b* of the battery case 5 that is dropped into the equipment case 3. These silicone rubber pieces 10 are provided at specific angular spacing relative to the peripheral surface of the bottom face 5*b* of the battery case 5, where, if there are 3 pieces, they may be provided with 120° spacing.

Figure 2:
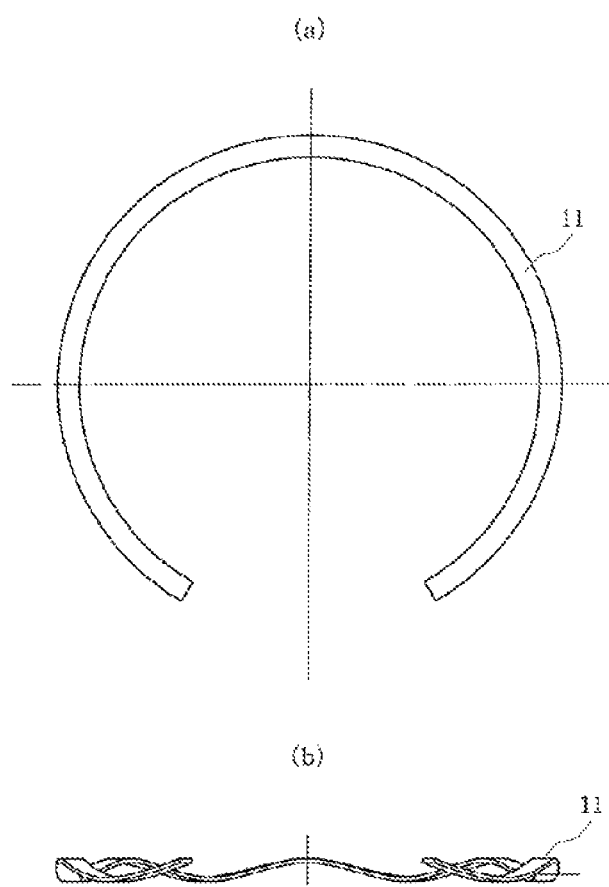
FIG. 2 is a diagram illustrating the state of a wave ring spring disposed within the equipment case.

With the battery case 5 dropped into the main unit 3-1 of the equipment case 3, the wave ring springs (C rings) 11 are disposed as illustrated in FIG. 2 around the peripheral surface at the top face 5*a* of the battery case 5. FIG. 2 (*a*) is a plan view and FIG. 2 (*b*) is a front view. These wave ring springs 11 have greater elasticity than the silicone rubber pieces 10, and the top surfaces thereof have undulations in the vertical direction. Moreover, a display board 12 is provided in the center portion of the top face 5*a* of the battery case 5. The display board 12 is connected to the FPC 9 from the battery case 5 through a connector, not shown. Note that the display board 12 also has electric circuitry, such as the converting portion, or the like, mounted thereon.

The top cover 3-2 of the equipment case 3 is fitted onto the main unit 3-1 in a state wherein the wave ring springs are disposed at the peripheral surface of the top face 5a of the battery case 5. Doing so causes the wave ring spring 11 to be pushed against the inner wall face of the top cover 3-2 of the equipment case 3, causing the wave ring spring 11 to deform elastically. That is, the wave ring spring 11 is interposed between the top face 5a of the battery case 5 and the inner wall 3b of the equipment case 3, to exhibit elastic force. Additionally, the silicon rubber pieces 10 are deformed elastically by pressing against the bottom face 5b of the battery case 5. That is, the silicone rubber pieces 10 are interposed between the bottom face 5b of the battery case 5 and the inner wall 3c of the equipment case 3, to exhibit elastic force.

As can be understood from the interior structure of this type, in the present example vibrations in the direction that is perpendicular to the top face 5a and the bottom face 5b of the battery case 5 are absorbed by the wave spring (first elastic member) that is interposed between the top face 5a of the battery case 5 and an inside wall 3b of the equipment case 3, and the plurality of silicon rubber pieces (the second elastic members) that are interposed between the bottom face 5b of the battery case 5 and the inside wall 3c of the equipment case 3, and the vibrations in the directions of the outer peripheral face 5c of the battery case 5 (all except for the top face 5a and the bottom face 5b) are absorbed by the elastic forces of the plurality of elastic tabs 5-2a (third elastic members) that are interposed between the outer peripheral surfaces 5c, which connect between the top face 5a and the bottom face 5b of the battery case 5, and the inner walls 3a of the equipment case 3, so that when there is a vibration on the equipment case 3, regardless of the direction, the relationship between the FPC 9 and the internal battery 4 are fixed securely, making it possible to ensure the connection between the inner battery 4 within the battery case 5 and the electronic circuits contained within the equipment case 3.

Additionally, in the present example, a display board 12 is disposed between the top face 5a of the battery case 5 and the inner wall of the equipment case 3 on the side facing the top face 5a of the battery case 5, and while it is difficult to secure adequate space for the disposal of the first elastic member at the center portion of the top face 5a of the battery case, a wave ring spring 11 is used for the first elastic member, and thus the loop-shaped space at the periphery of surface of the top face 5a of the battery case 5 is used efficiently, making it possible to provide the first elastic member without leading to an increase in the size of the equipment case 3. Doing so makes it possible to reduce the vibrations themselves through not producing an increase in the size of the equipment case 3. Furthermore, the use of the wave ring spring 11 makes it possible to absorb the tolerances of the battery case 5 and the equipment case 3.

Additionally, because silicon rubber pieces 10 were used as the second elastic members in the present example, that is, because low resilience elastic members with elasticity less than that of the wave ring spring 11 and that have surfaces that adhere to the bottom face 5b of the battery case 5 are used as the second elastic members, the battery case 5 can be supported stably from the bottom in the normal installation orientation wherein the bottom face 5b of the battery case 5 is downward.

Additionally, in the present example, a plurality of elastic tabs 5-2a that are formed integrally with a portion of the outer peripheral surface 5c of the battery case 5 is used as the third elastic member, thus making it possible to prevent an increase in size of the equipment case 3 and to reduce the number of parts. That is, while it is desirable to reduce the space between the outer peripheral surfaces 5c of the battery case 5 and the inner walls 3a of the equipment case 3 that are facing said outer peripheral surfaces 5c in order to reduce the vibrations in the directions that are perpendicular to the outer peripheral surfaces 5c of the battery case 5, doing so would make it difficult to provide the third elastic members between the outer peripheral surfaces 5c of the battery case 5 and the facing inner walls 3a of the equipment case 3, which ultimately would bring about an increase in the size of the equipment case 3. In contrast, in the present example, a plurality of elastic tabs 5-2a is formed integrally with the outer peripheral faces 5c of the battery case 5, thus making it possible to reduce the number of parts and possible to prevent an increase in the size of the equipment case 3.

Note that while in the example set forth above a wave ring spring 11 was used as the first elastic member, a plurality of silicon rubber pieces 10 was used as the second elastic member, and a plurality of elastic tabs 5-2a was used as the third elastic member, there is no limitation to the elastic members of these types. For example, instead of the plurality of silicon rubber pieces 10, a single ring-shaped elastic member may be disposed at the peripheral surface of the bottom face 5b of the elastic case 5, and instead of the plurality of elastic tabs 5-2a, a single ring-shaped elastic member may be fitted into the outer peripheral surfaces 5c of the battery case 5.

The internal battery-type field device according to the present invention, as an internal battery-type field device for measuring a physical quantity of a fluid that flows in a pipe portion, has an internal battery as the driving power source, and thus can be applied to a variety of devices such as electromagnetic flow meters for measuring flow rates of fluids, differential pressure meters for measuring differential pressures in fluids, and static pressure meters for measuring static pressures in fluids.

The invention claimed is:

1. An internal battery-type field device for measuring a physical quantity of a fluid flowing in a pipe portion, comprising:
   a connecting portion that extends from the pipe portion;
   an equipment case that is connected to the connecting portion;
   an internal battery that is contained in the equipment case and supplies driving power to the internal battery-type field device;
   a battery case that holds the internal battery, the battery case having
      a first face,
      a second face that is a face opposite the first face, and
      a third face that is an outer peripheral face of the battery case which connects the first face with the second face;
   a first elastic member that exhibits an elastic force, interposed between the first face of the battery case and an inner wall of the equipment case;
   a second elastic member that exhibits an elastic force, interposed between the second face of the battery case and the inner wall of the equipment case; and
   a third elastic member that exhibits an elastic force, interposed between the third face of the battery case and the inner wall of the equipment case, wherein
   the first elastic member is a wave ring-shaped spring disposed on the first face of the battery case along a peripheral edge of the first face.

2. The internal battery-type field device as set forth in claim 1, further comprising:
a display board provided on a center portion of the first face of the battery case, wherein
the wave ring-shaped spring is provided on the first face of the battery case to surround the display board.

3. The internal battery-type field device as set forth in claim 1, further comprising:
a fourth elastic member that exhibits an elastic force, provided in the battery case to push the internal battery in a direction toward the third face of the battery case.

4. An internal battery-type field device for measuring a physical quantity of a fluid flowing in a pipe portion, comprising:
a connecting portion that extends from the pipe portion;
an equipment case that is connected to the connecting portion;
an internal battery that is contained in the equipment case and supplies driving power to the internal battery-type field device;
a battery case that holds the internal battery, the battery case having
a first face,
a second face that is a face opposite the first face, and
a third face that is an outer peripheral face of the battery case which connects the first face with the second face;
a first elastic member that exhibits an elastic force, interposed between the first face of the battery case and an inner wall of the equipment case;
a second elastic member that exhibits an elastic force, interposed between the second face of the battery case and the inner wall of the equipment case; and
a third elastic member that exhibits an elastic force, interposed between the third face of the battery case and the inner wall of the equipment case, wherein
the second elastic member is a low resilience elastic member having elasticity less than that of the first elastic member and having a surface that adheres to the second face of the battery case.

5. The internal battery-type field device as set forth in claim 4, wherein
the second elastic member is a silicon rubber piece.

6. An internal battery-type field device for measuring a physical quantity of a fluid flowing in a pipe portion, comprising:
a connecting portion that extends from the pipe portion;
an equipment case that is connected to the connecting portion;
an internal battery that is contained in the equipment case and supplies driving power to the internal battery-type field device;
a battery case that holds the internal battery, the battery case having
a first face,
a second face that is a face opposite the first face, and
a third face that is an outer peripheral face of the battery case which connects the first face with the second face;
a first elastic member that exhibits an elastic force, interposed between the first face of the battery case and an inner wall of the equipment case;
a second elastic member that exhibits an elastic force, interposed between the second face of the battery case and the inner wall of the equipment case; and
a third elastic member that exhibits an elastic force, interposed between the third face of the battery case and the inner wall of the equipment case, wherein
the third elastic member is a plurality of flat springs and cut-away portions formed integrally with a portion of the outer peripheral surface of the battery case.

* * * * *